(12) United States Patent
Zhu et al.

(10) Patent No.: US 9,436,576 B2
(45) Date of Patent: Sep. 6, 2016

(54) METHODS, SYSTEMS AND APPARATUS TO CAPTURE ERROR CONDITIONS IN LIGHTWEIGHT VIRTUAL MACHINE MANAGERS

(75) Inventors: Bing Zhu, Shanghai (CN); Peng Zou, Shanghai (CN); Madhukar Tallam, Santa Clara, CA (US); Luhai Chen, Shanghai (CN); Kai Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 159 days.

(21) Appl. No.: 13/993,257

(22) PCT Filed: Jun. 29, 2012

(86) PCT No.: PCT/CN2012/077867
§ 371 (c)(1),
(2), (4) Date: Jun. 11, 2013

(87) PCT Pub. No.: WO2014/000253
PCT Pub. Date: Jan. 3, 2014

(65) Prior Publication Data
US 2014/0006877 A1    Jan. 2, 2014

(51) Int. Cl.
*G06F 11/00*    (2006.01)
*G06F 11/34*    (2006.01)
*G06F 11/07*    (2006.01)

(52) U.S. Cl.
CPC ....... *G06F 11/3466* (2013.01); *G06F 11/0712* (2013.01); *G06F 11/0778* (2013.01)

(58) Field of Classification Search
CPC .................................................. G06F 11/0712
See application file for complete search history.

(56) References Cited

U.S. PATENT DOCUMENTS

| 5,437,033 | A | * | 7/1995 | Inoue | G06F 9/45533 |
| | | | | | 714/10 |
| 7,739,684 | B2 | | 6/2010 | Baumberger | |
| 8,146,082 | B2 | | 3/2012 | Belay | |

(Continued)

FOREIGN PATENT DOCUMENTS

| CN | 101667144 | 3/2010 |
| CN | 101872323 | 10/2010 |

(Continued)

OTHER PUBLICATIONS

"Intel 64 and IA-32 Architectures Software Developer's Manual: vol. 3C: System Programming Guide, Part 3", Intel Corporation, Mar. 2012 (617 pages).

(Continued)

*Primary Examiner* — Bryce Bonzo
*Assistant Examiner* — India Davis
(74) *Attorney, Agent, or Firm* — Hanley, Flight & Zimmerman, LLC (57) ABSTRACT

Methods and apparatus are disclosed to capture error conditions in lightweight virtual machine managers. A disclosed example method includes defining a shared memory structure between the VMM and a virtual machine (VM), when the VM is spawned by the VMM, installing an abort handler on the VM associated with a vector value, in response to detecting an error, transferring VMM state information to the shared memory structure, and invoking the abort handler on the VM to transfer contents of the shared memory structure to a non-volatile memory.

24 Claims, 8 Drawing Sheets

(56) References Cited

U.S. PATENT DOCUMENTS

| | | | |
|---|---|---|---|
| 2005/0114855 A1 | 5/2005 | Baumberger | |
| 2006/0294518 A1* | 12/2006 | Richmond | G06F 9/45558 718/1 |
| 2007/0006226 A1 | 1/2007 | Hendel | |
| 2010/0250824 A1 | 9/2010 | Belay | |
| 2011/0231710 A1 | 9/2011 | Laor | |
| 2011/0246986 A1* | 10/2011 | Nicholas | G06F 11/0712 718/1 |

FOREIGN PATENT DOCUMENTS

| | | |
|---|---|---|
| CN | 102207896 | 10/2011 |
| WO | 2010133507 | 11/2010 |

OTHER PUBLICATIONS

"AMD64 Virtualization Codenamed 'Pacifica' Technology: Secure Virtual Machine Architecture Reference Manual", Advanced Micro Devices, Revision 3.01, May 2005 (124 pages).

"Core Dump", From Wikipedia on Jun. 2, 2012 <http://en.wikipedia.org/w/index.php?title=Core_dump&oldid=494274601> (4 pages).

"Windows 9x", From Wikipedia on Jun. 4, 2012 <http://en.wikipedia.org/w/index.php?title=Windows_9x&printable=yes> (11 pages).

International Searching Authority, "Written Opinion", issued in connection with PCT application No. PCT/CN2012/077867, dated Mar. 26, 2013 (3 pages).

International Searching Authority, "International Search Report", issued in connection with PCT application No. PCT/CN2012/077867, dated Mar. 26, 2013 (3 pages).

Taiwan Intellectual Property Office, "Office Action," issued in connection with Taiwanese Patent Application No. 102120720, issued Jul. 27, 2015 (15 pages).

Taiwan Intellectual Property Office, "Search Report," issued in connection with Taiwanese Patent Application No. 102120720, issued Jul. 27, 2015 (2 pages).

International Bureau, "International Preliminary Report on Patentability," issued in connection with International Patent Application No. PCT/CN2012/077867, mailed Jan. 8, 2015 (5 pages).

Taiwan Intellectual Property Office, "Office Action," issued in connection with Taiwanese Patent Application No. 102120720, issued Feb. 24, 2015 (4 pages).

Taiwan Intellectual Property Office, "Search Report," issued in connection with Taiwanese Patent Application No. 102120720, issued Feb. 13, 2015 (3 pages).

Taiwan Intellectual Property Office, "Notice of Allowance," issued in connection with Taiwanese Patent Application No. 102120720, issued Aug. 28, 2015 (4 pages).

European Patent Office, "Extended European Search Report," issued in connection with European Patent Application No. 12880072.9, mailed Jan. 11, 2016 (9 pages).

Zabaljauregui, "Hardware Assisted Virtualization Intel Virtualization Technology," XP002752278, Jun. 2008, retrieved from <http://linux.linti.unlp.edu.ar/images/f/f/Vtx.pdf>, retrieved on Dec. 16, 2015 (54 pages).

* cited by examiner

METHODS, SYSTEMS AND APPARATUS TO CAPTURE ERROR CONDITIONS IN LIGHTWEIGHT VIRTUAL MACHINE MANAGERS

FIELD OF THE DISCLOSURE

This disclosure relates generally to virtualization, and, more particularly, to methods, systems and apparatus to capture error conditions in lightweight virtual machine managers.

BACKGROUND

Virtual machine managers (VMMs) facilitate virtual machines (VMs) to utilize resources of an underlying platform. Example VMMs may allow one or more VMs to share such resources in a manner that preserves cross VM security and manages memory, processes, interrupts and/or protection faults for each active VM.

DETAILED DESCRIPTION

Operating systems typically employ built-in mechanisms to detect non-recoverable errors and provide memory dumps to assist developers during debug operation(s). A memory dump provides information indicative of a recorded state of working memory and/or registers of a computer program. Additionally, the memory dump may include general register information of an underlying platform on which the computer program executes. Prior to an operating system crash, the core dump collects platform information and stores it to non-volatile memory to that a post-crash (sometimes referred to as post-mortem analysis) review can occur to reveal conditions that elicited the prior crash.

In the event an operating system (OS) is running in a virtualized manner managed by a virtual machine manager (VMM), memory dump(s) may occur in a similar manner without affecting one or more alternate virtual machines (VMs), such as other OSs. On the other hand, in the event the VMM experiences an internal error (e.g., de-referencing a NULL pointer, accessing non-existing physical memory, internal accidental logic defects, etc.), the VMM may not have adequate resources to perform one or more memory dump(s). For example, some VMMs are referred to as "lightweight VMMs" that lack file system access support. In an effort to minimize and/or even eliminate VMM attack points, one or more mechanisms to a VMM may be removed, such as file system access support. Such removal of one or more mechanisms of a VMM also permit the VMM to consume a relatively smaller profile of a system platform, thereby reducing platform resource consumption.

Methods, apparatus, systems and/or articles of manufacture disclosed herein facilitate VMM troubleshooting in the event of fatal errors during lightweight VMM execution. As described in further detail below, in the event of a fatal VMM error, one or more event injections invokes a guest OS to transfer error information from shared VMM/Guest memory (e.g., volatile random access memory (RAM)) to a non-volatile storage (e.g., hard disk drive). In some examples, the VMM invokes and/or otherwise requests one or more built-in file system access services associated with one or more active guest OSs managed by the VMM. After transferring error information to non-volatile memory, such as platform register states, memory images, etc., each guest OS may shut down in a more graceful manner and/or invoke a crash notification (e.g., a "blue screen of death," etc.).

Figure 1:
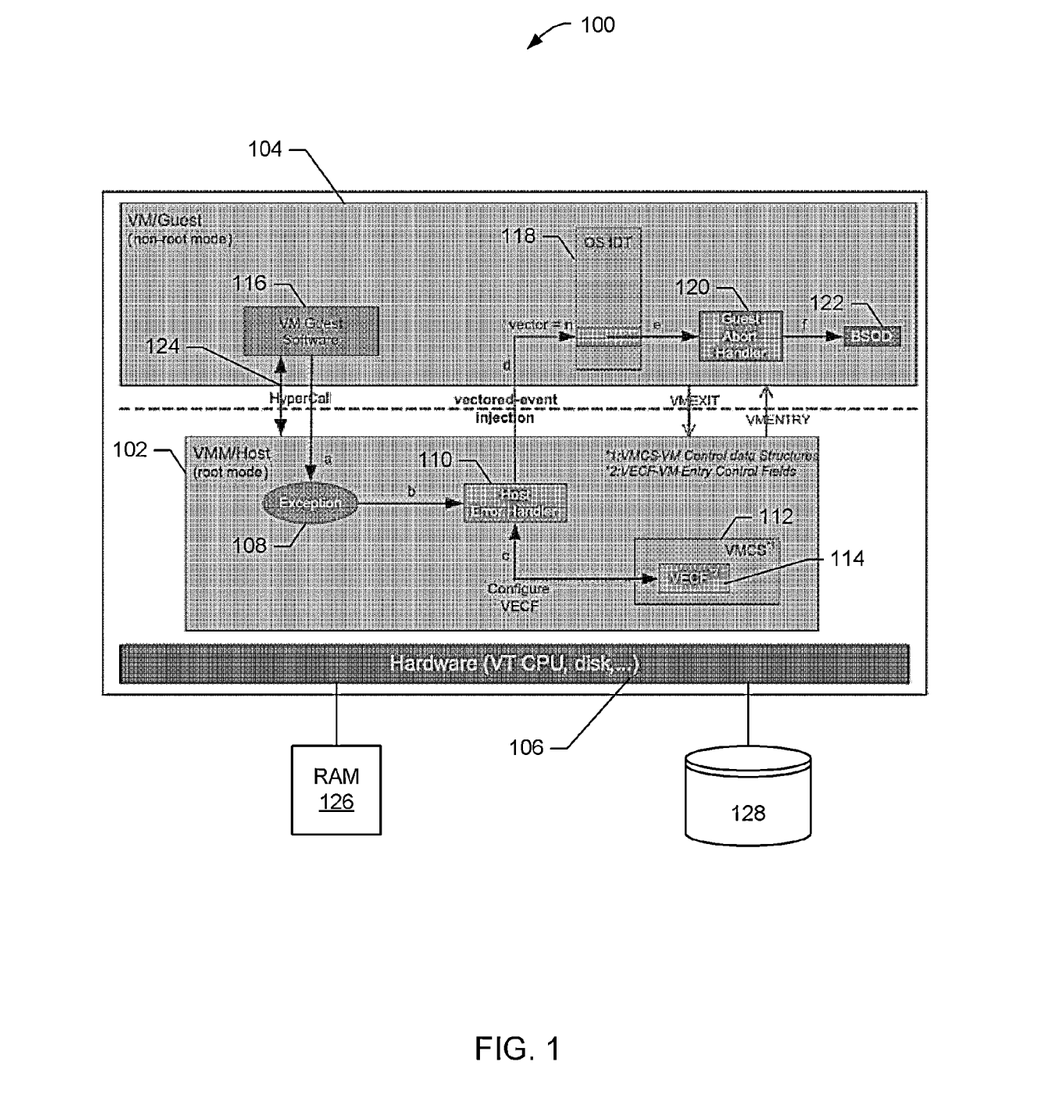
FIG. 1 is a schematic illustration of an example system consistent with the teachings of this disclosure to capture error conditions in lightweight virtual machine managers.

FIG. 1 illustrates an example virtualization system 100 that includes a VMM (e.g., a host, which is sometimes referred to as root mode) 102, a VM (e.g., a guest OS, which is sometimes referred to as non-root mode) 104, and underlying platform hardware 106. The example platform hardware 106 may include, but is not limited to processor(s), disk drive(s), network element(s) and/or memor(ies) (e.g., RAM, read only memory (ROM), FLASH, etc.). The example VMM 102 includes an exception handler 108, a host error handler 110, virtual-machine control data structures (VMCSs) 112, which include any number of VM-entry control fields (VECFs) 114, as described in further detail below.

The example guest 104 (or other VM) includes guest software 116, an OS interrupt description table (IDT) 118, a guest abort handler 120, and crash notification 122. In operation, a communication interface 124 facilitates communication between the VMM 102 and each guest, such as the example guest 104 of FIG. 1. The communication interface 124 may include, but is not limited to a hypervisor call system, such as HyperCall or VMCALL in Intel-based virtualization systems. In the event the example guest software 116 causes an exception that is detected by the example exception handler 108, the exception is detected by the example host error handler. In other examples, exceptions may be caused by and/or otherwise experienced by the VMM 102. VMM exceptions include, but are not limited to divide-by-zero attempts, invalid memory access attempts, etc. As discussed above, some VMMs do not have file system access support, which prevents a memory dump to non-volatile memory. Methods, systems, apparatus and/or articles of manufacture disclosed herein collect and store error information in shared volatile memory, and invoke one or more guests to employ native and/or customized file system access mechanisms to transfer the contents of shared volatile memory to non-volatile storage, such as a disk-drive. Non-volatile storage of platform state(s) permits, in part, post-mortem analysis of the platform for debugging.

In response to detecting an error (e.g., a fatal error), the example host error handler 110 populates volatile shared memory with platform state information. The example volatile shared memory may be RAM 126 of the example platform hardware 106. The example host error handler 110 also configures the example VMCS 112 to initiate one or more event injections to one or more available guest(s), such as the example guest VM 104 of FIG. 1. Generally speaking, a VMM transfers control to a VM by using VM entries, sometimes referred to as VMX transactions. Behaviors of VM entries are controlled by VMCSs, and may include execution of VMLAUNCH or VMRESUME instructions, and associated data structures are located in a specified host memory region that can only be visible to the host VMM. Such protection of the mechanisms that may control VM behavior enhance VMM security and/or the security of the one or more VMs that are managed by the VMM. While the above example VMM control mechanism includes VMX transactions, methods, apparatus, systems and/or articles of manufacture disclosed herein are not limited thereto. For example, some processors employ a secure virtual machine (SVM) architecture having associated SVM instructions to manage operating-mode control, memory management, intercepts, interrupts, exceptions, state-change management, system-management mode, processor initialization and/or data structure operations.

In response to invoking one or more VM entries, the example OS IDT 118 of the guest 104 references a supplied vector value. At least one vector value provided by the example host error handler 110 during the guest event injection initiates the guest abort handler 120. As described in further detail below, when each new and/or additional VM is initiated by the VMM 102, the example host error handler 110 configures the associated OS IDT with at least one additional vector value. Additionally, the example host error handler 110 adds a corresponding guest abort handler 120 to the guest 104 that is associated with the new vector value. The example guest abort handler 120, when invoked, accesses the shared volatile memory (e.g., RAM 126), and employs file access services to transfer contents of the shared volatile memory to non-volatile memory (e.g., a hard drive 128 of the platform hardware 106). In effect, the example event injection allows lightweight VMMs to be implemented on a platform while taking advantage of native and/or customized file access services of one or more guest VMs. Additionally, after and/or during any transfer of volatile memory contents to non-volatile memory, the example guest abort handler 120 initiates the crash notification 122 (e.g., a blue screen of death, a customized error message, etc.).

Figure 2:
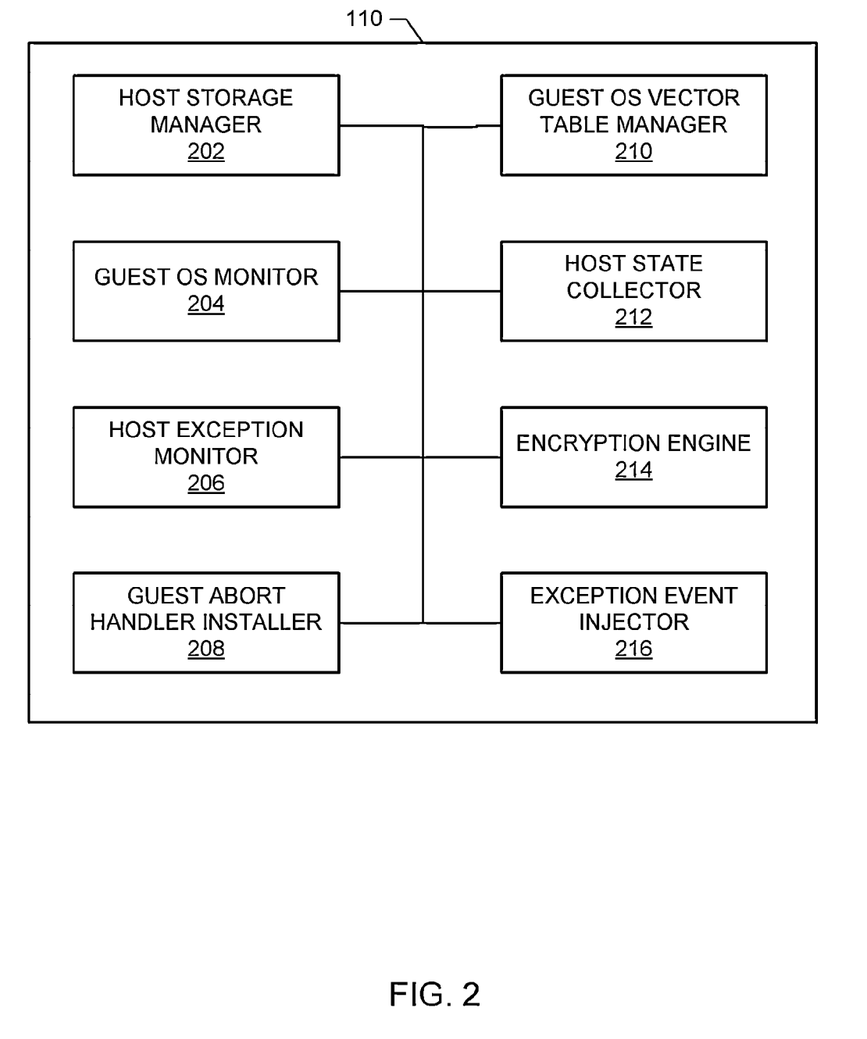
FIG. 2 is a schematic illustration of an example host error handler of the example system of FIG. 1.

FIG. 2 is a schematic illustration of the example VMM host error handler 110 of FIG. 1. In the illustrated example of FIG. 2, the host error handler 110 includes a host storage manager 202, a guest OS monitor 204, a host exception monitor 206, a guest abort handler installer 208, a guest OS vector table manager 210, a host state collector 212, an encryption engine 214 and an exception event injector 216. In operation, the example host storage manager 202 defines and/or otherwise allocates shared memory to be used as a repository for platform and/or guest VM state information. Access privileges to the shared memory, such as the example RAM 126 of FIG. 1, may be set as read-only for one or more guest VMs managed by the example VMM 102.

The example guest OS monitor 204 detects and/or otherwise determines when a new and/or additional VM is started in the virtualization system 100. In response to detecting a new VM, such as the example guest 104 of FIG. 1, the example guest abort handler installer 208 installs the guest abort handler 120 on the guest 104. Additionally, the example guest OS vector table manager 210 configures the guest 104 OS IDT 118 to include a new vector to be associated with the installed guest abort handler 120. Accordingly, when the appropriate vector is called and/or otherwise invoked by the host error handler 110, the installed guest abort handler 120 begins execution, as described in further detail below.

However, in the event that the example guest OS monitor 204 does not detect and/or otherwise determine that a new and/or additional VM is started in the virtualization system 100, the example host exception monitor 206 determines whether an error has occurred. If not, then the example guest OS monitor 204 continues to determine whether new and/or additional VMs are initiated in the example virtualization system 100. If, on the other hand, an error is identified, then the example host exception monitor 206 determines what type of error has occurred. For example, for non-fatal errors, the example host state collector 212 may only reveal minimal information about the state of the VMM. Generally speaking, VMM security is important in virtualized environments to minimize one or more points of weakness with which an attacker may exploit. The more information a potential attacker knows about VMM register state(s) and/or contents, the more opportunities afforded for illicit attacks on the VMM and/or VMs managed thereby. In other examples, the host state collector 212 will store detailed VMM state information, such as register values and/or images to the shared RAM 126 when a fatal error occurs. Such detailed information may further be encrypted by the encryption engine 214 to safeguard such details against attack and/or disclosure.

If the example virtualization system 100 has two or more executing VMs, such as two guest OSs, then the example VMM error handler 110 determines whether to initiate event injection for all or some of the guest OSs. To increase security, the example VMM error handler 110 may select only one guest OS as a primary VM and/or otherwise trusted VM to handle file system storage of encrypted VMM state information. In other examples, the VMM error handler 110 may proceed with event injection for all operating VMs of the system 100 to gather as much debug information as possible. The example exception event injector 216 configures VM-entry interruption-information fields, configures VM-entry exception error code information and/or executes VMRESUME VMX instructions to complete the file system transfer from volatile to non-volatile memory. As described above, the VECFs control VM-entry behaviors, in which the example VM-entry interruption-information field contains 32 bits of a format consistent with Table 1.

TABLE 1

| Bit Position | Content |
| --- | --- |
| 7:0 | Vector Interrupt or Exception |
| 10:8 | Interruption type:<br>0: External interrupt<br>1: Reserved<br>2: Non-maskable interrupt (NMI)<br>3: Hardware exception<br>4: Software interrupt<br>5: Privileged software exception<br>6: Software exception<br>7: Other event |
| 11 | Deliver error code (0 = do not deliver; 1 = deliver) |
| 30:12 | Reserved |
| 31 | Valid |

In the illustrated example of Table 1, bits 7:0 determine which entry in the guest OS IDT is used to invoke the example guest abort handler 120, bits 10:8 determine details of how an injection is performed, bit 11 determines whether delivery pushes an error code on a guest stack, bit 31 allows the VM entry to inject an event if set to 1, and the valid bit is cleared on every VM exit operation. In addition to the example VM-entry interruption-information field of Table 1, the example host error handler 110 may also modify a VM-entry exception error code, and a VM-entry instruction length field to determine a value of instruction pointer register(s) pushed on a stack when the guest OS is handling an event. After configuring fields, the example host error handler 110 may invoke a VMRESUME instruction to perform VM entry operation(s).

Figure 3:
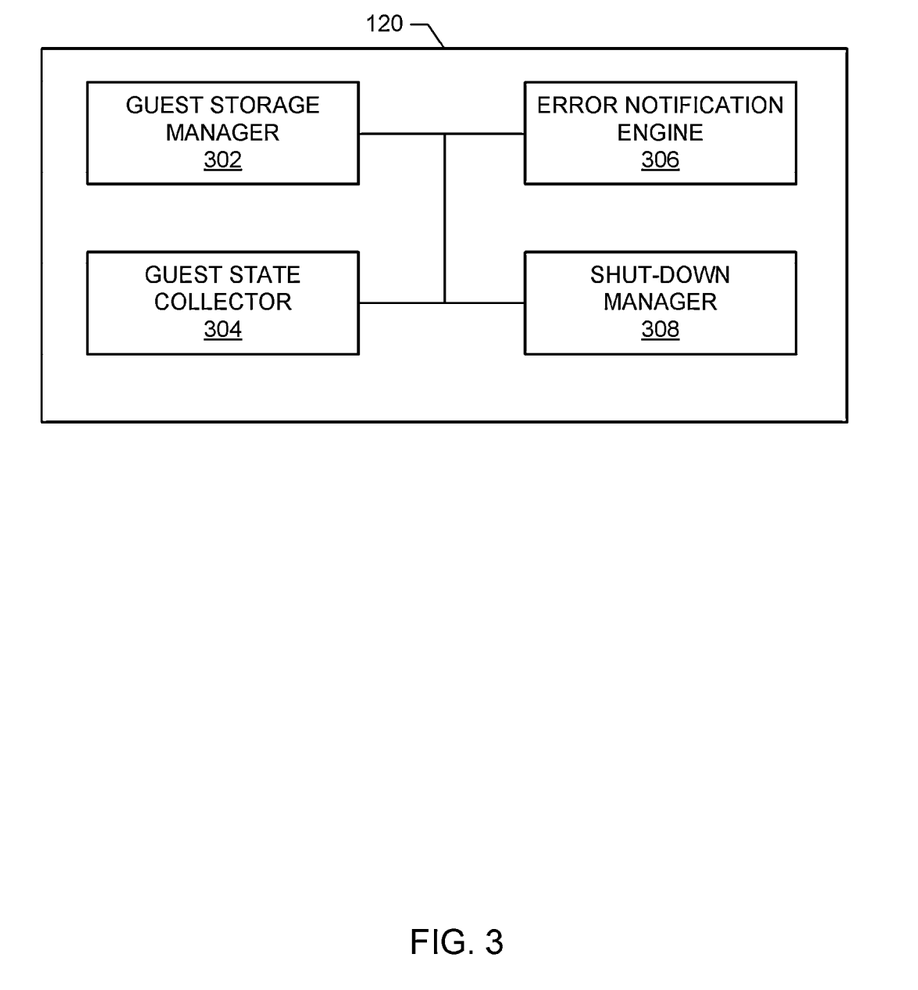
FIG. 3 is a schematic illustration of an example guest abort handler of the example system of FIG. 1.

FIG. 3 is a schematic illustration of the example guest abort handler 120 of FIG. 1. In the illustrated example of FIG. 3, the guest abort handler 120 includes a guest storage manager 302, a guest state collector 304, an error notification engine 306 and a shut-down manager 308. In operation, the example OS IDT 118 receives a vector from the example host error handler 110 containing a value associated with the example guest abort handler 120. Upon execution of the guest abort handler 120, the example guest storage manager 302 transfers contents of the shared memory structure (e.g., the RAM 126) to non-volatile memory (e.g., the hard-drive 128). As discussed above, the example host error handler 110 previously performed a state examination of the VMM 102 and stored VMM state information in the shared memory. The example guest state collector 304 gathers information indicative of the VM state, such as register values, and the example guest storage manager 302 transfers the guest VM state information to non-volatile memory. The example error notification engine 306 invokes one or more notification screen(s), such as a customized error screen, a blue screen of death, and/or a kernel panic screen. The example shut-down manager 308 initiates a VM guest shut-down procedure to allow the guest to stop in as graceful manner as possible.

While an example manner of implementing the example virtualization system 100, the example VMM host error handler 110 and the example guest abort handler 120 to capture error conditions in lightweight virtual machine managers has been illustrated in FIGS. 1-3, one or more of the elements, processes and/or devices illustrated in FIGS. 1-3 may be combined, divided, re-arranged, omitted, eliminated and/or implemented in any other way. Further, the example virtualization system 100, the example VMM 102, the example VM 104, the example exception handler 108, the example host error handler 110, the example VMCS 112, the example VECF 114, the example OS IDT 118, the example guest abort handler 120, the example crash notification 122, the example host storage manager 202, the example guest OS monitor 204, the example host exception monitor 206, the example guest abort handler installer 208, the example guest OS vector table manager 210, the example host state collector 212, the example encryption engine 214, the example exception event injector 216, the example guest storage manager 302, the example guest state collector 304, the example error notification engine 306 and/or the example shut-down manager 308 of FIGS. 1-3 may be implemented by hardware, software, firmware and/or any combination of hardware, software and/or firmware. Additionally, and as described below, the example virtualization system 100, the example VMM 102, the example VM 104, the example exception handler 108, the example host error handler 110, the example VMCS 112, the example VECF 114, the example OS IDT 118, the example guest abort handler 120, the example crash notification 122, the example host storage manager 202, the example guest OS monitor 204, the example host exception monitor 206, the example guest abort handler installer 208, the example guest OS vector table manager 210, the example host state collector 212, the example encryption engine 214, the example exception event injector 216, the example guest storage manager 302, the example guest state collector 304, the example error notification engine 306 and/or the example shut-down manager 308 of FIGS. 1-3 may be implemented by hardware, software, firmware and/or any combination of hardware, software and/or firmware. Thus, for example, any of the example virtualization system 100, the example VMM 102, the example VM 104, the example exception handler 108, the example host error handler 110, the example VMCS 112, the example VECF 114, the example OS IDT 118, the example guest abort handler 120, the example crash notification 122, the example host storage manager 202, the example guest OS monitor 204, the example host exception monitor 206, the example guest abort handler installer 208, the example guest OS vector table manager 210, the example host state collector 212, the example encryption engine 214, the example exception event injector 216, the example guest storage manager 302, the example guest state collector 304, the example error notification engine 306 and/or the example shut-down manager 308 of FIGS. 1-3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example virtualization system 100, the example VMM 102, the example VM 104, the example exception handler 108, the example host error handler 110, the example VMCS 112, the example VECF 114, the example OS IDT 118, the example guest abort handler 120, the example crash notification 122, the example host storage manager 202, the example guest OS monitor 204, the example host exception monitor 206, the example guest abort handler installer 208, the example guest OS vector table manager 210, the example host state collector 212, the example encryption engine 214, the example exception event injector 216, the example guest storage manager 302, the example guest state collector 304, the example error notification engine 306 and/or the example shut-down manager 308 of FIGS. 1-3 are hereby expressly defined to include a tangible computer readable storage medium such as a memory, DVD, CD, Blu-ray, etc. storing the software and/or firmware. Further still, the example system 100 of FIG. 1 may include one or more elements, processes and/or devices in addition to, or instead of, those illustrated in FIGS. 1-3, and/or may include more than one of any or all of the illustrated elements, processes and devices.

Flowcharts representative of example machine readable instructions for implementing the system 100 of FIG. 1, the host error handler 110 of FIGS. 1 and 2, and the guest abort handler 120 of FIGS. 1 and 3 are shown in FIGS. 4-7. In this example, the machine readable instructions comprise a program for execution by a processor such as the processor 812 shown in the example computer 800 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example program is described with reference to the flowcharts illustrated in FIGS. 4-7, many other methods of implementing the example system 100, the example error handler 110 and the example guest abort handler 120 to capture error conditions in lightweight virtual machine managers may alternatively be used. For example, the order of execution of the blocks may be changed, and/or some of the blocks described may be changed, eliminated, or combined.

As mentioned above, the example processes of FIGS. 4-7 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable storage medium is expressly defined to include any type of computer readable storage and to exclude propagating signals. Additionally or alternatively, the example processes of FIGS. 4-7 may be implemented using coded instructions (e.g., computer readable instructions) stored on a non-transitory computer readable storage medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable storage and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 4:
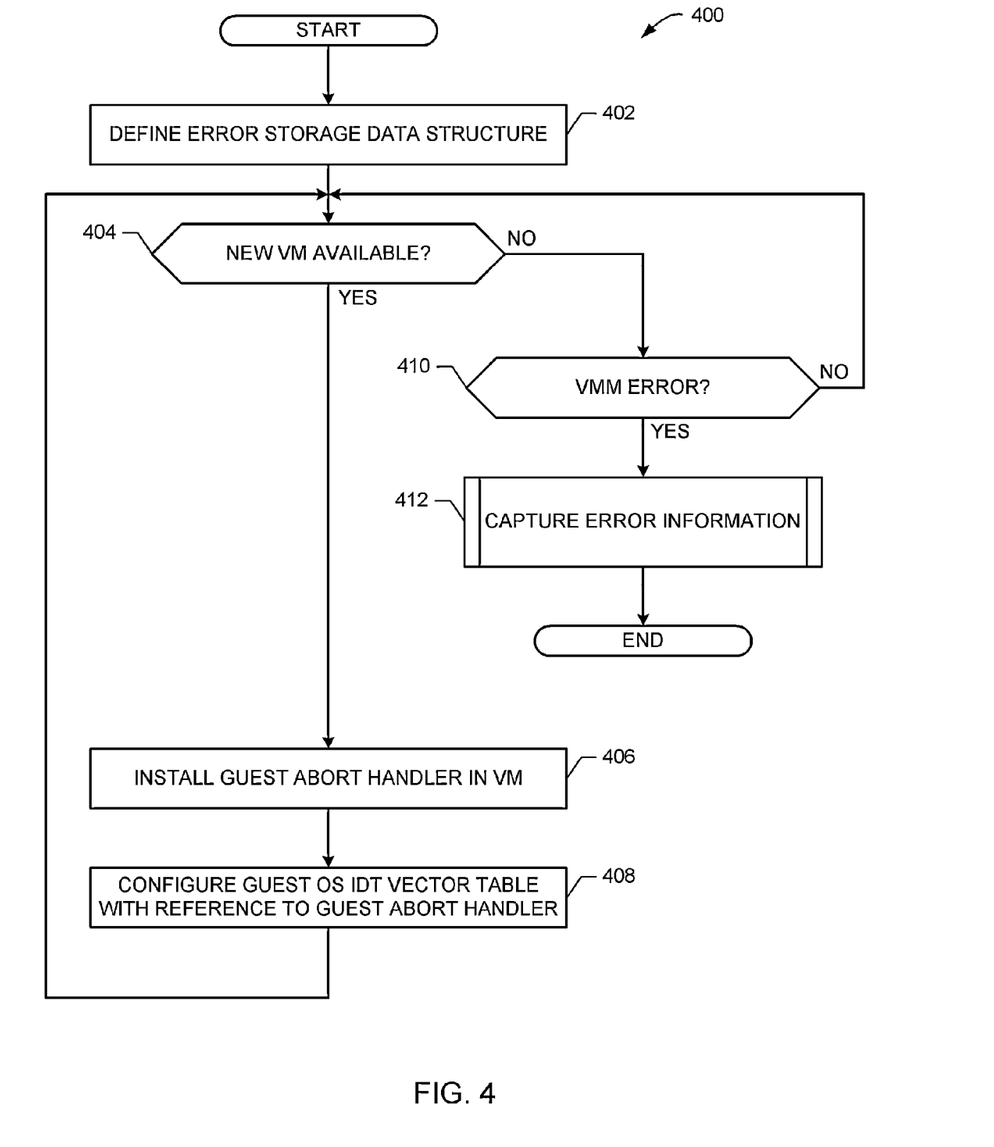
FIGS. 4-7 are flowcharts representative of example machine readable instructions which may be executed to capture error conditions in lightweight virtual machine managers.

The program 400 of FIG. 4 begins at block 402 where the example host storage manager defines one or more error storage data structure(s). In some examples, the error storage data structures include RAM of the underlying hardware 106, such as the example RAM 126 of FIG. 1. The example host storage manager 202 may establish privileged access levels to improve security concerns, such as establishing read-only privileges for one or more VMs (e.g., the guest 104), and/or establishing full-access privileges for the VMM (e.g., the host 102). The example guest OS monitor 204 determines whether a new VM has been spawned by the VMM 102 (block 404). If so, then the example guest abort handler installer installs a guest abort handler in the newly spawned VM (block 406). As described above, each VM (e.g., guest OS 104) includes an OS interrupt description table, such as the example OS IDT 118 of FIG. 1. The example OS IDT 118 informs the controlling processor which interrupt service routine(s) should be executed based on receipt of specific vector value(s). To configure the newly spawned VM 104 OS IDT 118, the example guest OS vector table manager 210 updates, appends, replaces and/or otherwise makes available a unique vector value to be stored in the OS IDT 118 (block 408). When a request of the unique vector value is received by the OS IDT 118 during run-time, a corresponding guest abort handler is invoked for execution.

In the event a new VM is not identified, available and/or otherwise newly spawned (block 404), the example host exception monitor 206 monitors the host VMM 102 of an instance of an error (block 410). If no error is detected and/or otherwise identified (block 410), control returns to the guest OS monitor 204 to determine whether a new VM is spawned by the VMM 102 (block 404). However, in the event of a VMM error detected by the example host exception monitor 206 (block 410), the example host exception monitor 206 initiates error information capture (block 412).

Figure 5:
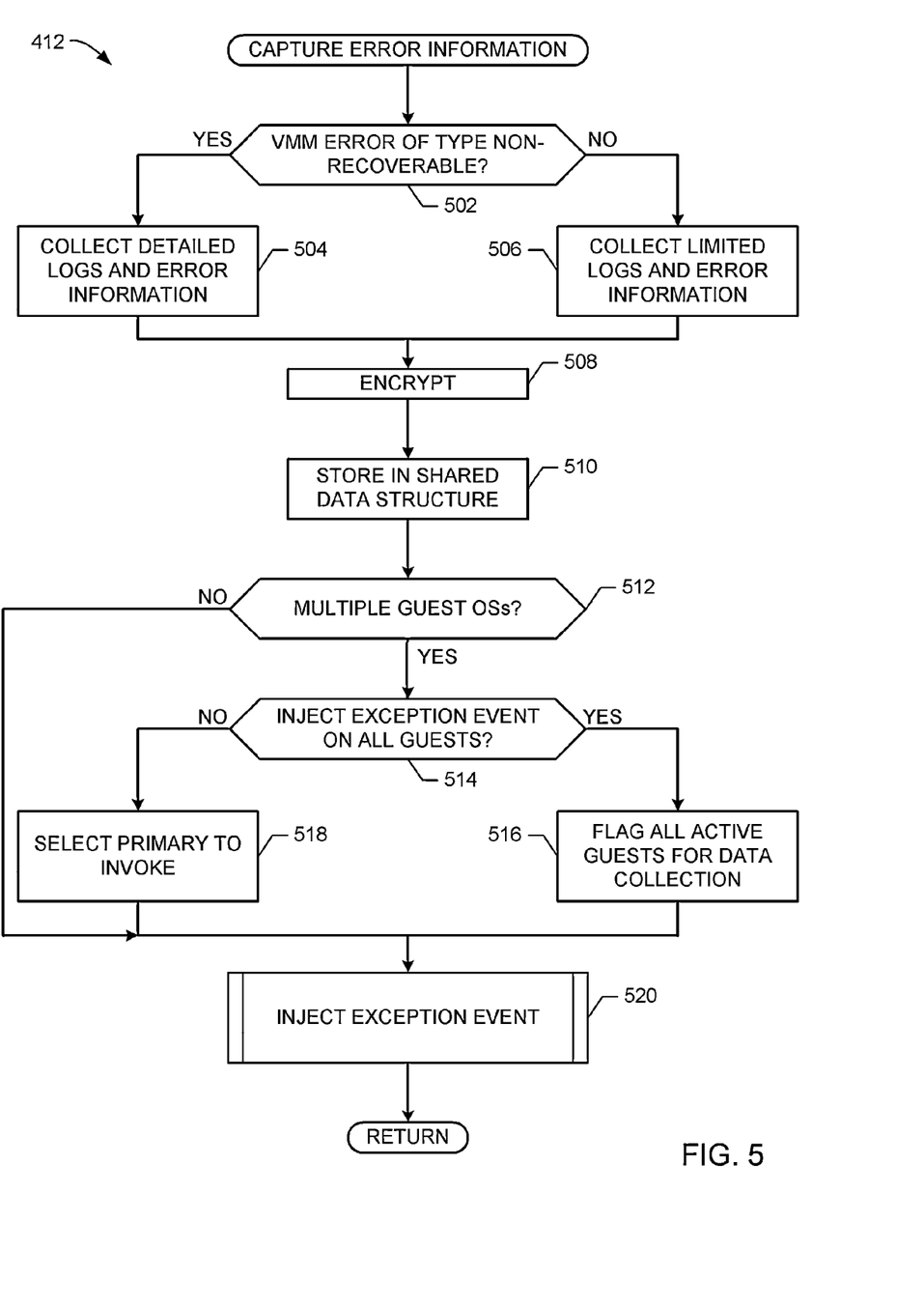
Figure 6:
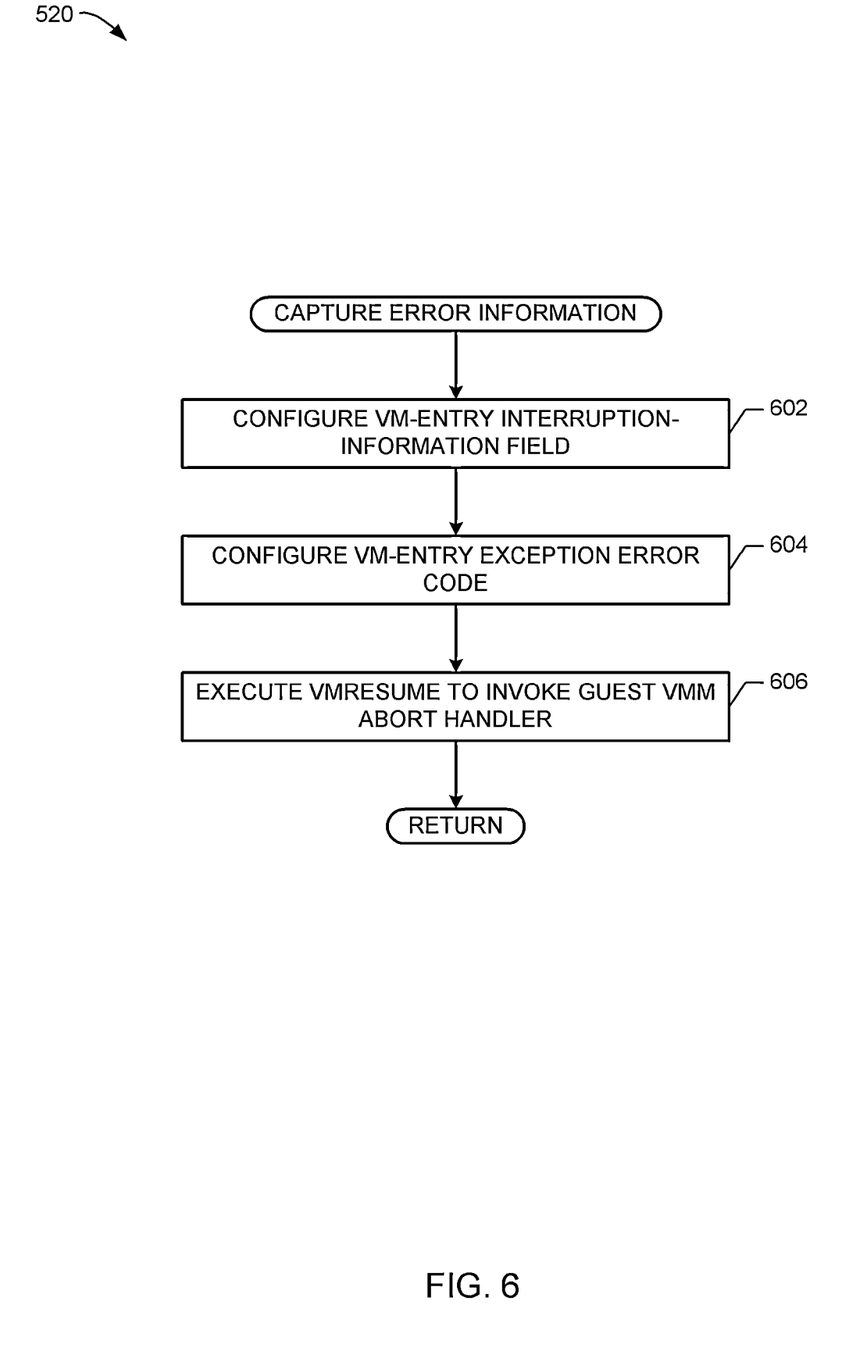

The program 412 of FIG. 5 begins at block 502 where the example host exception monitor 206 determines whether the identified error is of a particular type, such as non-recoverable. To minimize and/or eliminate security risks, detailed VMM state information is typically prevented from being stored outside operational constraints of the VMM framework. In the event the identified error is deemed fatal and/or otherwise non-recoverable (block 502), then the example host state collector 212 collects detailed logs related to error codes and register state(s) of the VMM to better assist post-mortem debugging efforts (block 504). On the other hand, in the event the identified error is deemed non-fatal and/or relatively less severe, then the example host state collector 212 collects logs related to error codes at a relatively higher level (block 506). Generally speaking, error logs collected by the example host state collector 212 may be of a relatively innocuous nature when compared to potential damage that a hacker may accomplish with detailed VMM state information. As such, only those errors having a relatively high severity (e.g., a severity level) justify saving detailed VMM state information to shared RAM 126. In some examples, a degree of severity and/or resolution of severity is determined and compared against a threshold and/or a table of error types. Those errors having a first resolution may be associated with a first type of VMM state information collection, while those errors having a second resolution (e.g., a greater degree of error severity) may be associated with a second type of VMM state information (e.g., a detailed VMM state information collection). As an additional safeguard, the example encryption engine 214 encrypts all content (block 508) stored by the host error handler 110 in shared memory 126 (block 510).

The example host VMM 102 may manage one or more VMs in addition to the example VM 104 of FIG. 1. The example guest OS monitor 204 determines whether the host VMM 102 is managing more than one VM (e.g., more than one guest OS) (block 512) and, if so, the example host error handler 110 determines whether to include all VMs as candidates for receiving an exception event (block 514). For example, debugging efforts may be improved when as much information as possible is collected regarding the VMM 102 and all spawned VMs. As described above, while the VMM 102 may reveal one or more error codes, register states and/or memory images, each executing VM may also include one or more error codes, register states and/or memory images. In some examples, the VMM host error handler 110 selects all running VMs to receive an exception event (block 514), and flags all available VMs that are active for data collection (block 516).

In other examples, such as circumstances involving heightened security concerns, the example host error handler 110 reduces a number of participants that store system information in the event of a failure. In such examples, the host error handler 110 does not authorize all available VMs to participate in event injection (block 514) and selects a primary VM and/or otherwise trusted VM to invoke for post mortem activity at restart (block 518). Additionally, the example host error handler 110 may identify that only the designated primary VM (e.g., the example VM 104 of FIG. 1) is authorized to receive an event injection and subsequently execute until a review and/or clearance has been completed of the VMM 102 and any associated error information (block 518).

In the event that the example VMM 102 only has a single active VM (block 512), or after desired VMs have been flagged to participate in event injection procedures (block 516), or after the primary VM is selected (block 518), the example exception event injector 216 is invoked (block 520). In the illustrated example of FIG. 6, the exception event injector 216 configures VM-entry interruption-information fields (block 602), and configures VM-entry exception error code(s) (block 604). Each of the fields and/or error codes may be implementation specific and/or otherwise tailored to the VMM type, the platform type and/or operating system nuances. When the VM-entry fields and/or error codes are configured, the example exception event injector 216 executes a VMRESUME instruction to invoke the guest abort handler 120 based on the corresponding vector value inserted into the VM-entry fields (block 606). In the event additional VMs have been identified for receiving an exception event, control returns to block 602 for each identified VM of interest.

Figure 7:
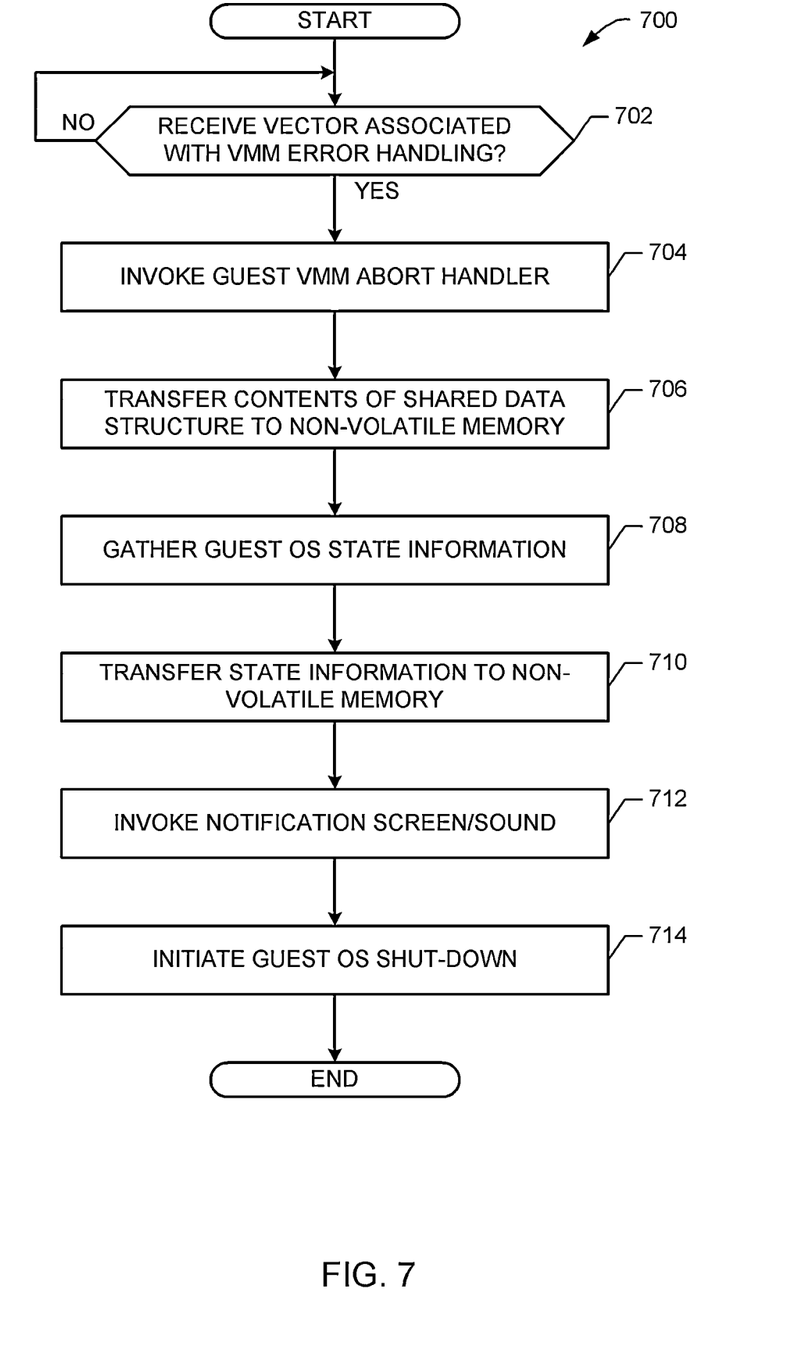

The program 700 of FIG. 7 begins at block 702 where the example VM 104 monitors the example OS IDT 118 for vectors indicative of service routines that should be executed. If a vector value is not received and/or if a vector value is received that is not associated with the example guest abort handler 120, then the example VM 104 continues to monitor received vector values (block 702). On the other hand, in the event a vector value associated with the example guest abort handler 120 is received (block 702), then the guest abort handler 120 is invoked for execution on the VM 104 (block 704). As discussed above, the host error handler 110 identified an error on the VMM 102 and took one or more actions to capture error details that may be helpful during post-mortem debugging analysis activities. The error details for the VMM 102 were collected and stored in a shared volatile memory 126 and, in some examples, encrypted before storing.

To allow the VMM 102 to retain valuable error information that may be useful during post-mortem analysis, while allowing the VMM 102 to minimize its resource footprint, the example guest storage manager 302 is invoked to employ system file access mechanism(s) to transfer contents of the shared data structure 126 to one or more non-volatile memories, such as the hard-disk drive 128 (block 706). Additionally, the example guest state collector 304 gathers state and/or error information associated with the VM managed by the VMM (block 708), and the example guest storage manager 302 transfers any such collected information to the non-volatile memory 128 (block 710). One or more error notifications are generated by the example error notification engine 306 (block 712), such as an error dump detail image for a video display and/or audio prompts. When all desired error information is collected (block 708), stored (block 710), and one or more error notification(s) are generated (block 712), the example shut-down manager 308 initiates a VM shut-down procedure (e.g., a guest OS shut down request) (block 714). One or more post-mortem debugging activities may be conducted using error information from the VMM 102 and/or the VM 104 in an effort to identify one or more causes for one or more errors of the VMM 102.

Figure 8:
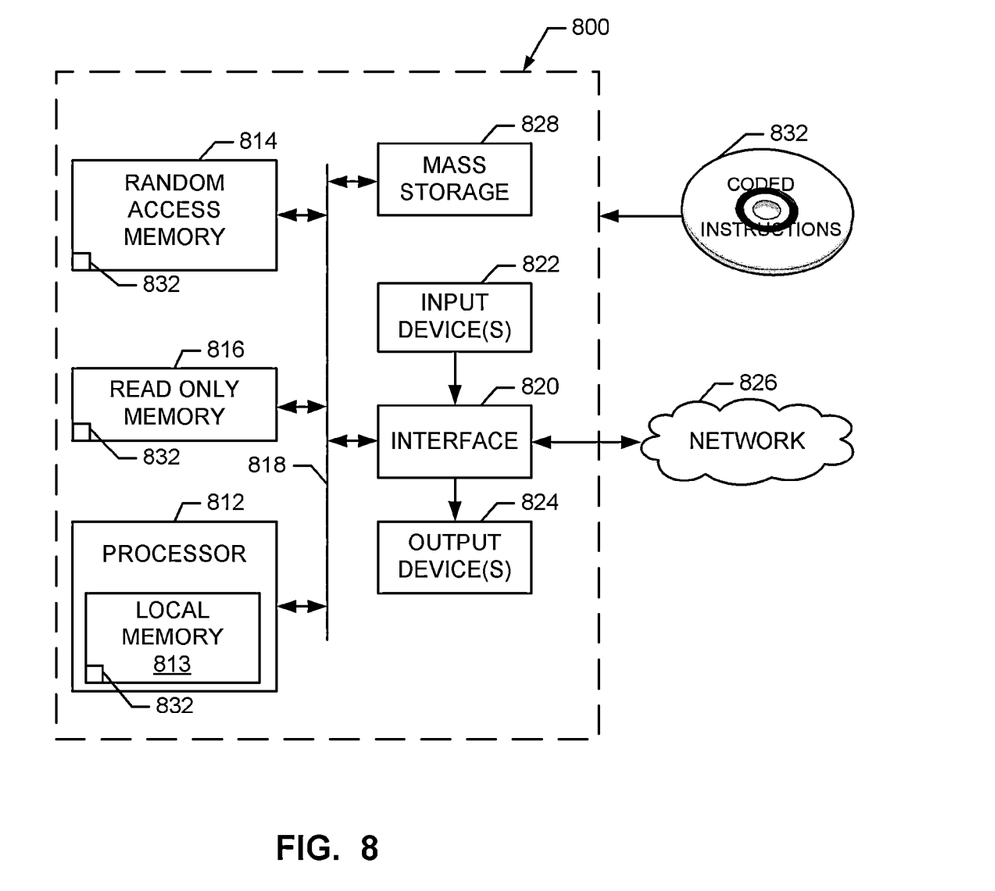
FIG. 8 is a schematic illustration of an example processor platform that may execute the instructions of FIGS. 4-7 to implement the example systems and apparatus of FIGS. 1-3.

FIG. 8 is a block diagram of an example processor platform 800 capable of executing the instructions of FIGS. 4-7 to implement the system 100 of FIG. 1, the host error handler 110 of FIGS. 1 and 2, and the guest abort handler 120 of FIGS. 1 and 3. The processor platform 800 can be, for example, a server, a personal computer, an Internet appliance, or any other type of computing device.

The system 800 of the instant example includes a processor 812. For example, the processor 812 can be implemented by one or more microprocessors or controllers from any desired family or manufacturer.

The processor 812 includes a local memory 813 (e.g., a cache) and is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 also includes an interface circuit 820. The interface circuit 820 may be implemented by any type of interface standard, such as an Ethernet interface, a universal serial bus (USB), and/or a PCI express interface.

One or more input devices 822 are connected to the interface circuit 820. The input device(s) 822 permit a user to enter data and commands into the processor 812. The input device(s) can be implemented by, for example, a keyboard, a mouse, a touchscreen, a track-pad, a trackball, isopoint and/or a voice recognition system.

One or more output devices 824 are also connected to the interface circuit 820. The output devices 824 can be implemented, for example, by display devices (e.g., a liquid crystal display, a cathode ray tube display (CRT), a printer and/or speakers). The interface circuit 820, thus, typically includes a graphics driver card.

The interface circuit 820 also includes a communication device such as a modem or network interface card to facilitate exchange of data with external computers via a network 826 (e.g., an Ethernet connection, a digital subscriber line (DSL), a telephone line, coaxial cable, a cellular telephone system, etc.).

The processor platform 800 also includes one or more mass storage devices 828 for storing software and data. Examples of such mass storage devices 828 include floppy disk drives, hard drive disks, compact disk drives and digital versatile disk (DVD) drives.

The coded instructions 832 of FIGS. 4-7 may be stored in the mass storage device 828, in the volatile memory 814, in the non-volatile memory 816, and/or on a removable storage medium such as a CD or DVD.

Methods, apparatus, systems and articles of manufacture to capture error conditions in lightweight virtual machine managers facilitate error detail collection capabilities in scaled-down VMM products. While scaled-down VMMs remove one or more functional mechanisms to reduce candidate hooks by which hackers can exploit, such mechanism removal also typically eliminates debugging data collection opportunities when the VMM crashes. Invoking available VM file system mechanisms allows the VMM to maintain its minimized footprint while facilitating valuable debugging data acquisition.

Methods, systems, apparatus and articles of manufacture are disclosed to capture error conditions in lightweight virtual machine managers. Some disclosed example methods include defining a shared memory structure between a virtual machine manager (VMM) and a virtual machine (VM), when the VM is spawned by the VMM, installing an abort handler on the VM associated with a vector value, in response to detecting an error, transferring VMM state information to the shared memory structure, and invoking the abort handler on the VM to transfer contents of the shared memory structure to a non-volatile memory. Additionally, the example methods include the VMM without file system access support. Other disclosed example methods include employing random access memory (RAM) as the shared memory structure, and configure the RAM with read-only access for the VM. In still other examples, the method includes configuring an interrupt description table to store the vector value. Some examples include the VMM state information performing a memory dump. Other examples include the VMM state information having VMM register state information. Some example methods include determining a severity of the error, gathering a first resolution of the error information when the severity is of a first level, and gathering a second resolution of the error information when the severity is of a second level. Still other example methods include the VM having a guest operating system, while other example methods include invoking the abort handler via VMX instructions, in which the VMX instructions are associated with entry-interruption-information fields, and the fields are tailored to include the vector value. Some example methods include the abort handler associated with a trusted VM.

Example apparatus to capture error conditions in lightweight virtual machine managers include a host storage manager to define a shared memory structure between the VMM and a virtual machine (VM), a guest abort handler to install an abort handler on the VM associated with a vector value when the VM is spawned by the VMM, a host error handler to transfer VMM state information to the shared memory structure in response to detecting an error, and an exception event injector to invoke the guest abort handler on the VM to transfer contents of the shared memory structure to a non-volatile memory. Some example apparatus include the shared memory structure having random access memory (RAM), and the host error handler to configure the RAM with read-only access for the VM. Other example apparatus include a guest operating system (OS) vector table manager to configure an interrupt description table to store the vector value. Still other example apparatus include a host exception monitor to determine a severity of the error, and a host state collector to gather a first resolution of the error information when the severity is of a first level, and to gather a second resolution of the error information when the severity is of a second level.

Some disclosed example articles of manufacture storing machine readable instructions are included that, when executed, cause a machine to define a shared memory structure between a virtual machine manager (VMM) and a virtual machine (VM), when the VM is spawned by the VMM, install an abort handler on the VM associated with a vector value, in response to detecting an error, transfer VMM state information to the shared memory structure, and invoke the abort handler on the VM to transfer contents of the shared memory structure to a non-volatile memory. Other example articles of manufacture cause the machine to employ random access memory (RAM) for the shared memory structure, and to configure the RAM with read-only access for the VM. Some example articles of manufacture cause the machine to configure an interrupt description table to store the vector table, while still other example articles of manufacture cause the machine to cause the machine to determine a severity of the error, to gather a first resolution of the error information when the severity is of a first level, and to gather a second resolution of the error information when the severity is of a second level. In some examples, the articles of manufacture cause the machine to invoke the abort handler via VMX instructions and to associate the VMX instructions with entry-interruption-information fields.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to capture error information from a virtual machine manager (VMM), comprising:
    defining a shared memory structure between the VMM and a virtual machine (VM) at a first time, the VMM without file system access support at the first time;
    when the VM is spawned by the VMM, installing an abort handler on the VM associated with a vector value;
    in response to detecting an error of the VMM at a second time, transferring VMM state information to the shared memory structure to enable access to a file system for the VMM at the second time; and
    preserving the VMM state information in a non-volatile memory at the second time by invoking the abort handler on the VM associated with the vector value to transfer the VMM state information in the shared memory structure via the file system.

2. A method as defined in claim 1, wherein the detected error is caused by the VMM.

3. A method as defined in claim 1, wherein the shared memory structure includes random access memory (RAM).

4. A method as defined in claim 3, further including configuring the RAM with read-only access for the VM.

5. A method as defined in claim 1, further including configuring an interrupt description table to store the vector value.

6. A method as defined in claim 1, further including determining a severity of the error.

7. A method as defined in claim 6, further including gathering a first resolution of the error information when the severity is of a first level, and gathering a second resolution of the error information when the severity is of a second level.

8. A method as defined in claim 1, wherein the VM includes a guest operating system.

9. A method as defined in claim 1, further including invoking the abort handler via VMX instructions.

10. A method as defined in claim 9, wherein the VMX instructions are associated with entry-interruption-information fields.

11. A method as defined in claim 10, wherein the fields are tailored to include the vector value.

12. An apparatus to capture error information from a virtual machine manager (VMM), comprising:
    a host storage manager to define a shared memory structure between the VMM and a virtual machine (VM) at a first time, the VMM without file system access support at the first time;
    a guest abort handler to install an abort handler on the VM associated with a vector value when the VM is spawned by the VMM;
    a host error handler to transfer VMM state information to the shared memory structure in response to detecting an error of the VMM at the second time to enable access to a file system for the VMM at the second time; and
    an exception event injector to preserve the VMM state information in a non-volatile memory at the second time by invoking the guest abort handler on the VM associated with the vector value to transfer the VMM state information in the shared memory structure via the file system.

13. An apparatus as defined in claim 12, wherein the shared memory structure includes random access memory (RAM).

14. An apparatus as defined in claim 13, wherein the host error handler is to configure the RAM with read-only access for the VM.

15. An apparatus as defined in claim 12, further including a guest operating system (OS) vector table manager to configure an interrupt description table to store the vector value.

16. An apparatus as defined in claim 12, further including a host exception monitor to determine a severity of the error.

17. An apparatus as defined in claim 16, further including a host state collector to gather a first resolution of the error information when the severity is of a first level, and to gather a second resolution of the error information when the severity is of a second level.

18. A tangible machine readable storage medium comprising instructions that, when executed, cause a machine to, at least:
define a shared memory structure between the VMM and a virtual machine (VM) at a first time, the VMM without file system access support at the first time;
when the VM is spawned by the VMM, install an abort handler on the VM associated with a vector value;
in response to detecting an error of the VMM at a second time, transfer VMM state information to the shared memory structure to enable access to a file system for the VMM at the second time; and
preserve the VMM state information in a non-volatile memory at the second time by invoking the abort handler on the VM associated with the vector value to transfer the VMM state information in the shared memory structure via the file system.

19. A machine readable storage medium as defined in claim 18, wherein the instructions, when executed, cause the machine to configure an interrupt description table to store the vector table.

20. A machine readable storage medium as defined in claim 18, wherein the instructions, when executed, cause the machine to determine a severity of the error.

21. A machine readable storage medium as defined in claim 20, wherein the instructions, when executed, cause the machine to gather a first resolution of the error information when the severity is of a first level, and to gather a second resolution of the error information when the severity is of a second level.

22. A machine readable storage medium as defined in claim 18, wherein the instructions, when executed, cause the machine to invoke the abort handler via VMX instructions.

23. A machine readable storage medium as defined in claim 22, wherein the instructions, when executed, cause the machine to associate the VMX instructions with entry-interruption-information fields.

24. A machine readable storage medium as defined in claim 23, wherein the instructions, when executed, cause the machine to tailor the fields to include the vector value.

* * * * *